United States Patent Office 3,773,745
Patented Nov. 20, 1973

3,773,745
NUTRIENT PROTEIN FROM KERATINACEOUS MATERIAL BY EXTRACTION WITH DIMETHYL-FORMAMIDE
William D. Goodwin, Decatur, Ga., assignor to The Athlon Corporation, Atlanta, Ga.
No Drawing. Filed July 30, 1971, Ser. No. 167,856
Int. Cl. A23j 1/10
U.S. Cl. 260—123.7  9 Claims

ABSTRACT OF THE DISCLOSURE

Avian feathers, particularly chicken feathers are solubilized by treatment with N,N-dimethylformamide or an aqueous solution thereof to yield a nutrient protein composition or alteration which is suitable for use as a food supplement and as an ingredient in food products, such as baked goods, flour, cake mixes, confectionery, soups, cereals and noodle or pasta products.

BACKGROUND OF THE INVENTION

The present invention relates to the solubilization of the keratinaceous constituents of avian feathers to derive therefrom a novel nutrient material suitable in itself as a food or for incorporation into food products.

It is known to hydrolyze keratinaceous materials such as feathers and the like by the use of alkalis such as strontium hydroxide, to produce a hydrolysate having a high content of the amino acids cystine, tyrosine and tryptophane, which is suitable for cosmetic use, and a process of this is disclosed, for example, in U.S. Pat. 1,974,554. It is also known to extract water soluble materials from a keratin structure such as animal horns, hair, hoofs, and the like, using various water-miscible polar solvents including alcohols and ketones, to obtain extracts adapted for topical use in human skin treatment.

The poultry processing industry operates on a scale which results in the production of large tonnages of by-product keratinaceous materials, principally feathers. Largely, the present disposal of these by-products is devoted to the production of feather meal. The industry is re-oriented by the present invention to the production of food for human consumption thereby upgrading the materials to a more valuable purpose and to using more effectively the economic potential of these by-products.

GENERAL DESCRIPTION OF THE INVENTION

In accordance with the present invention, there is provided a novel method for the solubilization and utilization of avian keratinaceous materials, and particularly of feathers of various domestic fowl, such as chickens, ducks, turkeys, and the like. The invention will be illustrated with regard to the treatment of chicken feathers, but it is to be understood that its scope is not to be considered as limited thereby.

In accordance with the invention, avian feathers and the like, such as chicken feathers, are subjected to the action of N,N-dimethylformamide (DMF) or an aqueous, or other solution thereof, for a period of time sufficient to solubilize the feathers as a protein soluble in the extractant.

N,N-dimethylformamide is a liquid, b. pt. 153° C., sp. gr. 0.949, which is miscible with water, and has been used heretofore principally as a solvent for polymeric materials. So far as known, it has not been used, prior to the present invention, as a medium for the solubilization of proteinaceous materials. In fact, both casein and gelatin are reported to be insoluble in DMF. Accordingly, it was surprising and unexpected to discover that dimethylformamide and its aqueous solutions act as a solvent of the protein of avian feathers, which is of primary nutrient value.

The dimethylformamide may be employed in 100% concentration, or in admixture with water in an amount not less than about 75% DMF by weight. The proportion of extractant to feathers will ordinarily range between about 15 and about 30 parts of DMF (100% basis) per part of feathers, by weight.

While whole feathers and their associated parts, including quill portions, may be treated in their removed condition, advantageously the feathers, including quill portions are crushed prior to contacting them with the DMF or DMF solution.

The solubilization may be performed at atmospheric or super-atmospheric pressure, but preferably it is carried out at atmospheric pressure, this being one of the advantages of the process of the invention. The temperature of the extraction will generally correspond to the chosen pressure, but for the purposes of the invention, the extraction is preferably carried out by contacting the feathers with boiling DMF or DMF solution at atmospheric pressure. Advantageously this is done by introducing the feathers, which may be crushed, into a body of DMF solution boiling and under reflux.

The treatment time will depend upon the nature of the feathers, the concentration of the DMF, and the extent to which the solvation is to be carried, as well as the usual parameters of temperature and pressure, but will generally be of the order of about 4 to about 8 hours, although the time can be extended to 20 hours or more. However, such extended treatment periods do not significantly increase the yield of extracted proteinaceous component, and thus the time interval chosen depends upon economic considerations. The use of aqueous DMF solutions may be preferable to that of pure DMF, since the latter may sometimes furnish a product slightly darker in color.

When the solubilization step is complete, the hot solution is separated from the insoluble feather material by any suitable method, as by filtration or centrifuging. The clarified solution is cooled to ambient temperature, and forms a gel.

The insoluble residue may be further extracted with DMF or DMF solution to obtain additional protein, or dried and milled to produce an animal feed.

The process of solubilization of the feather proteins, in accordance with the invention, is to be distinguished from hydrolyses, such as those known heretofore. The process of the invention results in the production of a digestible whole protein from avian feathers. While not wishing to be bound by any partciular theory, it is believed that in the treatment with dimethylformamide the keratinaceous constituents of the avian feathers, which possess a quaternary structure, are broken up to relieve the stresses in the long chain molecules. In the keratinaceous state, the protein is in a nondigestible form owing to the inaccessability of the peptide linkages to digestive enzymes. The quaternary structure of a protein is due largely to secondary valence bond forces. Compared with a primary valence bond these secondary forces are individually extremely weak but they are nevertheless significant because of the large number present. Breaking these secondary valence forces results in loss of quaternary structure and hence increases the susceptibility of the resulting protein to enzymatic action. In this way, the process of the invention yields a protein concentrate which is virtually 100% digestible. The direct production or even destruction of amino acids which is characteristic of acid or alkaline hydrolytic treatments is thus avoided or minimized by the use of dimethylformamide, whereby a protein product representing a break-up of long chain molecules is obtained.

The protein gel obtained by the cooling of the clarified DMF extract may be dried by any suitable means, recovering the DMF which is recycled. Following the DMF procedure of solubilizing the protein and its subsequent filtration removing undissolved solids, the solution is concentrated by evaporating the solvent to a point where the protein content reaches 65% or higher. Care must be exercised to avoid overheating as the binary azeotropic solvent content approaches minimal values—sufficient only to provide a medium to maintain a hydrocolloid capable of dissolving in a detergent. Following one practice the gel is spray dried by passing the gel under pressure through a tungsten discharge nozzle into a stainless steel chamber maintained at atmospheric pressure, into which dry air is introduced at a temperature of about 400° F., the air being withdrawn from the chamber at about 240° F., but these temperatures are illustrative, and may be varied within wide limits. This drying step also serves to volatilize the DMF which is condensed and recovered. The proteinaceous product is a dry powder without any vestige of DMF, light tan in color, having a particle size averaging about 2 mils or slightly more, the particles being crystalline in appearance. The product has a pH of about 7, and is 100% digestible and non-toxic.

Another method of drying employs the use of drum dryers of flakers whereby the gel is fed between two heated drums rotating in opposite directions such that the wetted surfaces display their evaporating film coating on the periphery of the drums untouched until reaching the stripping blades where the dried film is removed in the form of flakes. This product is likewise void of any residual DMF.

The protein can be extracted and altered from keratinaceous tissue by a number of applications of DMF or DMF solutions by progressively longer period of refluxing and/or progressively higher temperatures. Each successive extraction yields protein of lower jelly strength and viscosity. Since a higher proportion of protein is extracted in the early treatment of keratin the proportion of high protein value is much greater than later treatments.

Typical illustrative analysis of the dried protein, as obtained from chicken feathers is as follows:

AMINO ACID ANALYSIS OF PROTEIN COMPOSITION

| Amino acid | $\mu$M/mg. protein [1] [2] | Percent amino acid in protein |
|---|---|---|
| Aspartic acid | .358 | 4.76 |
| Threonine | .345 | 4.11 |
| Serine | 1.292 | 13.57 |
| Proline | .875 | 1.01 |
| Glutamic acid | .624 | 9.18 |
| Glycine | 1.008 | 7.57 |
| Alanine | .411 | 3.66 |
| Valine | .618 | 7.24 |
| Cystine | .088 | 2.11 |
| Methionine | .017 | .025 |
| Isoleucine | .376 | 4.93 |
| Leucine | .570 | 7.48 |
| Tyrosine | .102 | 1.85 |
| Phenylalanine | .267 | 4.11 |
| Lysine | .039 | .57 |
| Histidine | .001 | .016 |
| Arginine | .377 | 6.57 |

[1] Micro mole per milligram of protein.
[2] Based on sample as 100% protein.

The protein composition of the invention is useful as a supplement to food materials to improve their nutritional value, such food materials including, for example, flour, baked goods, biscuit and cake mixes, pancake mixes, soups, gravies, cereals, noodle or pasta products and confectionery. The protein product of the invention can also be used directly by forming the dried powder into tablets, wafers, and the like, for consumption by humans and animals, or as a feed additive for veterinary use. The concentrate may be added to candy to balance the protein value of the candy. The concentrate contains all of the essential amino acids except tryptophane, and if desired, a small amount, e.g., 1.75% of tryptophane may be admixed with the concentrate.

DESCRIPTION OF THE PREFERRED EMBODIMENTS

The following examples illustrate the practice of the present invention, but are not to be regarded as limiting:

EXAMPLE 1

100 g. of chicken feathers, 210 g. dimethylformamide and 860 g. water are refluxed at boiling temperature at atmospheric pressure for 3 hours in a three-necked flask equipped with a reflux condenser and gas trap. Insoluble feather material is separated from the hot reaction mixture by filtration, and the clarified solution allowed to cool to room temperature to form a gel, of a 100% protein and digestible and non-toxic product. Refluxing the same mixture for 3 hours yields 79.5 g. protein, while refluxing for 20 hours yields 80.2 g.

EXAMPLE 2

Proceeding as in Example 1, 100 g. chicken feathers are admixed with 630 g. DMF and 315 g. water, and the mixture is refluxed for 3 hours, the yield being 70.5 g. Refluxing for 15 hours yields 72.3 g.

EXAMPLE 3

Proceeding as in Example 1, 100 g. chicken feather portions are refluxed respectively with 945 g. DMF and 375 g. water, and 1215 g. DMF and 475 g. water. The respective yields are 79 g. and 87.5 g. of dried protein.

EXAMPLE 4

Biscuits

1¾ cups Bisquick
5 tablespoons protein
½ cup water

Do not excessively handle dough. In an oven at 450°, bake for 10–12 minutes.

EXAMPLE 5

Pancakes

1¾ cups plus 1 tablespoon Bisquick
3 tablespoons protein
1 egg
1⅓ cups milk

Beat to a smooth batter.

EXAMPLE 6

Coffee cake

1¾ cups plus 2 tablespoons Bisquick
1½ tablespoons protein
2 tablespoons sugar
1 egg
⅔ cups water Mix all ingredients. Bake in greased pan for 20–25 minutes. Oven at 400°.

EXAMPLE 7

Waffles

1¾ cups plus 1 tablespoon Bisquick
3 tablespoons protein
2 tablespoons shortening, melted or salad oil
1⅓ cups milk
1 egg Beat to a smooth batter.

The biscuit baking mix used in the previous examples can be considered representative of a typical preparation consisting of wheat flour, shortening, leavening, buttermilk powder, salt and dextrose,

What is claimed is:

1. Process for the preparation of a protein composition from avian keratinaceous material which comprises the steps of:
   (a) refluxing said keratinaceous material with N,N-dimethylformamide or an aqueous solution thereof at the boiling temperature of N,N - dimethylformamide or the aqueous solution thereof and atmospheric pressure for a sufficient time to solubilize and extract said protein composition;
   (b) separating the protein-containing composition from the insoluble residue; and
   (c) recovering the protein composition from said extract.

2. The process of claim 1 in which the keratinaceous material is poultry feathers.

3. The process of claim 2 in which the keratinaceous material is chicken feathers.

4. The process of claim 1 in which the solubilizing agent is an aqueous solution of N,N-dimethylformamide having a concentration not less than about 60% DMF by weight.

5. The process of claim 1 in which the proportion of N,N-dimethylformamide to keratinaceous material is between about 15 and about 30 parts by weight.

6. The process of claim 1 in which the solubilization is performed with a boiling N,N-dimethylformamide solution at atmospheric pressure.

7. The process of claim 1 in which said protein composition is recovered in the form of a dried powder or flakes.

8. The process of claim 1 in which the N,N-dimethylformamide is recovered and recycled to step (a).

9. The process of claim 1 wherein the protein composition as recovered is a food.

References Cited
UNITED STATES PATENTS

| | | | |
|---|---|---|---|
| 2,445,028 | 7/1948 | Jones et al. | 260—123.7 X |
| 2,445,029 | 7/1948 | Jones et al. | 260—123.7 X |

HOWARD E. SCHAIN, Primary Examiner

U.S. Cl. X.R.
99—2 R, 18, 84